Patented Oct. 18, 1938

2,133,787

UNITED STATES PATENT OFFICE 2,133,787

DI(AMINOARYLSULPHON)AMIDES AND A METHOD OF MAKING THE SAME

Elmore Hathaway Northey, Bound Brook, N. J., assignor to The Calco Chemical Company, Inc., Bound Brook, N. J., a corporation of Delaware No Drawing. Application January 11, 1938, Serial No. 184,415

13 Claims. (Cl. 260—449)

This invention relates to di(aminoarylsulphon)amides and methods of preparing them.

Monosulphonamides of aromatic compounds have been prepared and some of them have achieved great practical importance as bacteriostats. Notably, the p-aminobenzenesulphonamide, (sulphanilamide), is widely used as a chemotherapeutic against streptococci, gonococci and similar bacteria. The monosulphonamides have also been used as intermediates for the production of azo dyes. A serious disadvantage of the commercially exploited monoaminosulphonamides, such as sulphanilamide, has lain in their relatively high toxicity. As a result, the difference between the minimum effective dose against such organisms as streptococci and the dose which produces serious results or even death is narrower than is desirable and a number of serious secondary toxic reactions have occurred.

The present invention is directed to aminodisulphonamides, many of which possess the important property of increased therapeutic effectiveness against bacteria without increased toxicity and generally with decreased toxicity. The compounds are therefore more useful as therapeutic agents because the greater difference between the effective dose and fatal dose renders their use much safer in practice.

The present invention is limited to di(aminoarylsulphon)amides and, in general, covers compounds having the following general formula:

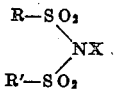

where R is an aminoaryl containing an amino or substituted amino group, R' is an aminoaryl and X is hydrogen, a metal or an alkyl or aryl radical.

While the invention is not limited to di(aminoarylsulphon)amides, this class is the preferred one and corresponds to the formula given above where both R and R' are aminoaryl groups. This preferred class includes some of the most effective therapeutic agents covered by the present invention. Most of the cheaper compounds belong to the benzene and naphthalene series but the invention is not limited to mono- and dinuclear compounds and, on the contrary, includes tri- and other poly-nuclear compounds such as those of the anthracene, phenanthrene, fluorene and similar series.

The position of the amino group on the radical R in the formula given above may vary and in its broader aspects the invention includes compounds in which the amino group is ortho, meta or para to the SO₂ group in the case of mononuclear compounds and in the alpha or beta positions in the case of naphthalene compounds. In the case of aliphatic compounds, the group may be situated at any point in the chain. For therapeutic purposes, the compounds in which the amino group is para to the SO₂ group are usually preferable and constitute a preferred species. In the case of azo dye intermediates, other positions of the amino group are frequently preferable.

For the purpose for which the compounds of the present invention are particularly useful, it is usually desirable, although not essential, that they be soluble and therefore compounds in which X in the formula above given is an alkali metal, magnesium, calcium or other base yielding soluble products are preferable.

For many purposes high solubility is not necessary and salts of other bases may be used which are insoluble or only sparingly soluble. Such bases include heavy metals such as silver, gold, mercury, bismuth, antimony, lead, aluminum, iron and arsenic compounds which are capable of forming salts. Other insoluble compounds include the alkyl and aryl compounds in which alkyl or aryl replaces the remaining hydrogen of the amino group. The possibility of preparing salts of heavy metals and similar compounds is of great importance therapeutically as many of these metals exert powerful actions against bacteria and other disease-producing organisms. Such compounds where the bacteriostatic action of the diaminoarylsulphonamides is reenforced or supplemented with therapeutically active metals or metal compounds such as for example arsenicals greatly increase the field of utility of the compounds of the present invention.

For therapeutic use, it is usually desirable to provide a substantially neutral medium; accordingly, the salts are preferable to the acids for this purpose. However, for other uses such as azo dye intermediates, the compounds may be present in the form of their acids, that is to say where X is hydrogen, and the present invention is therefore in no sense restricted to salts.

The compounds of the present invention are new chemical compounds and are claimed as such, regardless of the method by which they have been prepared. I have found, however, that good yields of products of high purity may be obtained, particularly in the case of the di(aminodiarylsulphon)amides, by bringing about reaction between an acylaminoarylsulphonchloride and ammonia or a monosulphonamide. This process is therefore also covered as a specific feature of the present invention.

The invention will be described in greater detail in conjunction with the following specific examples which describe the production of typical compounds falling under the present invention. The invention is, however, not limited to the details therein set forth. Unless otherwise expressed, parts are by weight and parts of water are by corresponding volume.

Example 1

Di(N-acetylsulphanil)amide

1 mol. of ammonia is dissolved in 150 parts of water at 10° C. and 2 mols of freshly prepared N-acetylsulphanilylchloride paste are gradually added with vigorous agitation. Sufficient 50% caustic soda solution is added to maintain a pH between 10 and 11.5 and ice is introduced from time to time to keep the temperature between 32 and 37° C. After all of the N-acetylsulphanilylchloride has been added and the pH has been finally adjusted by means of caustic soda, stirring is continued for about one hour.

The reaction mixture is cooled to 10° C. and solid matter filtered off. The precipitate constitutes crude sodium di(N-acetylsulphanil)amide. It is purified by recrystallization from hot water in which it is very soluble. The free di(N-acetylsulphanil)amide may be obtained by acidifying the sodium salt with a mineral acid. The free diamide is almost insoluble in dilute acids and melts with decomposition at 284–286° C.

Instead of using N-acetylsulphanilylchloride and ammonia, equi-molecular quantities of N-acetylsulphanilylchloride and N-acetylsulphanilamide may be used, the procedure being the same and the same product being produced.

Example 2

Sodium disulphanilamide

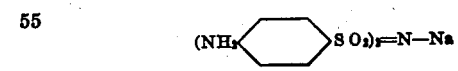

The sodium di(N-acetylsulphanil)amide described in Example 1 is hydrolyzed by boiling 1 mol. of the crude paste with 6 mols of caustic soda in 200 parts of water until no further increase in diazotizable amine is noted. The hydrolysis mixture is then cooled to 10° C. and the crude sodium disulphanilamide filtered off.

The crude product may be purified by recrystallization from hot water in which the compound is very soluble, preferably in the presence of decolorizing carbon. The mother liquors may be treated with acid to produce a pH of 2 to 3 at which pH the free amide shows its minimum solubility. At body temperature, the solubility of sodium disulphanilamide in water is 20 gs. per 100 cc. and at 10° C., this has dropped to 9.6 gs. per 100 cc. The product melts with decomposition to a characteristic blue color at temperatures above 300° C. On diazotization with nitrous acid, a tetrazo compound is obtained which may be coupled with the usual coupling components to form azo dyestuffs.

Salts other than the sodium salt may be made in the case of some of the stronger bases by reaction of a carbonate or hydroxide of the base with disulphanilamide and in other cases, by double decomposition in aqueous solution of the sodium salt of disulphanilamide with a suitable salt of the metal.

The following table gives a number of representative salts and their method of preparation and properties. The abbreviation Dsa. is used for disulphanilamide and Sod. for sodium. In referring to the solubility, s. is used for soluble, v. for very, sl. for slightly, mod. for moderately and ext. for extremely. In the table under method of preparation, the reaction takes place in aqueous solution except where specifically noted.

Salts of disulphanilamide

| Salt | Method of preparation | Appearance | Solubility Hot water | Solubility Cold water |
|---|---|---|---|---|
| Lithium | Dsa.+Li$CO_3$ | Small white flat rods or plates | V. s. | V. s. |
| Magnesium | Sod. Dsa.+Mg$Cl_2$ | White rectangular plates | V. s. | Mod. s. |
| Calcium | Dsa.+Ca(OH)$_2$ | Rods or needles | Ext. s. | V. s. |
| Barium | Sod. Dsa.+Ba$Cl_2$ | Needles | Mod. s. | Sl. s. |
| Cupric | Sod. Dsa.+Cu$SO_4$ | Light green needles [1] | Mod. s. | Sl. s. |
| Nickel | Sod. Dsa.+Ni$Cl_2$ | Pale green thin plates | Ext. s. | V. s. |
| Silver | Sod. Dsa.+Ag$NO_3$ | White grains [2] | Sl. s. | V. sl. s. |
| Plumbous | Sod. Dsa.+Pb($NO_3$)$_2$ | White fine needles | Sl. s. | V. sl. s. |
| Mercuric | Sod. Dsa.+Hg$Cl_2$ | White diamond shape plates | Sl. s. | l. |
| Bismuth | Sod. Dsa.+Bi($NO_3$)$_3$ in glycerine | White needles | V. sl. s. | l. |
| Aluminum | Sod. Dsa.+Al$_2$(S$O_4$)$_3$ | White rods and needles | Sl. s. | V. sl. s. |
| Ferric | Sod. Dsa.+Fe$Cl_3$ | Light yellow feathers | l. | l. |
| Ammonium | Dsa.+$NH_4$OH | White needles | V. s. | V. s. |
| Diethyl ammonium | Dsa.+($C_2H_5$)$_2$NH | Rectangular prisms | V. s. | Sl. s. |
| Mono-n-amyl ammonium | Dsa.+$C_5H_{11}NH_2$ | Tetrahedral and spherical segments | S. | Sl. s. |
| Di-n-amyl ammonium | Sod. Dsa.+($C_5H_{11}$)$_2$NH.HCL | Feathers | Sl. s. | V. sl. s. |
| Triethanol ammonium | Dsa.+(HO.$CH_2$.$CH_2$)$_3$N | Not readily crystallizable syrup | Ext. s. | Ext. s. |

[1] In cold solution is precipitated as bronze scales which spontaneously change to the above.
[2] Apparently quite light stable.

Example 3

Dimetanilamide

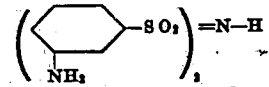

1 mol of metanitrobenzenesulphonamide is dissolved in 1600 parts of water containing 16 parts of soda ash and 30 parts of caustic soda, the temperature being 45° C. 1.3 mols of metanitrobenzenesulphonchloride are then added during one half hour while maintaining a pH of 10–11 by the addition of caustic soda solution as required. During reaction the temperature is maintained between 45 and 60° C. and after reaction is complete, stirring is continued for 1 hour. The mixture is then cooled, the crude product crystallized out and filtered. Purification is effected by recrystallization from water and results in sodium di(metanitrobenzenesulphon)amide.

The nitro compound produced above is reduced in 2½ times its weight of 28% ammonia by passing a stream of hydrogen sulphide through the suspension while vigorously agitating. At first cooling is provided, but as the reaction moderates, the mixture is heated at a slow boil under a reflux condenser with continual passage of hydrogen sulphide for 1 hour. After reaction is substantially complete, air is passed through the hot solution to remove excess ammonia and to oxidize sulphides to sulphur. Thereupon the mixture is made alkaline to phenolphthalein with caustic soda and the sulphur filtered off. Hydrochloric acid is then added to bring the pH of the clarified solution to 4.5 to 5 and crude dimetanilamide is filtered off. Purification is effected by recrystallization from solution in alkali, preferably after treatment with activated charcoal. The product melts with decomposition to a deep blue green liquid above 330° C.

Example 4

*Metanitrobenzenesulphonyl(N-metanitrobenzenesulphonylsulphanil) amide*

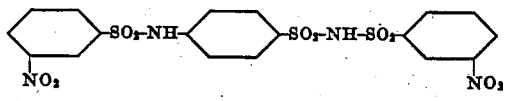

1 mol of sulphanilamide is suspended in 500 parts of water and 2 mols of metanitrobenzenesulphonylchloride is gradually added with agitation. A pH of 9 to 11 is maintained by the addition of 50% caustic soda as necessary, the temperature being kept at 40–50° C. by the addition of ice. After the addition is complete and the pH is adjusted, the reaction mixture is stirred for an hour and then strongly acidified and the precipitate of crude metanitrobenzenesulphonyl(N-metanitrobenzenesulphonsulphanil) amide filtered off.

Example 5

*Sodium metanil(N-metanilylsulphanil) amide*

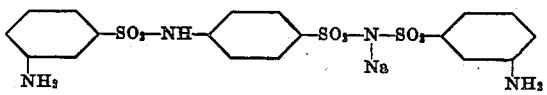

The nitro compound produced in Example 4 is dissolved in 800 parts of strong ammonia and reduced by passing a rapid stream of hydrogen sulphide through it at first with cooling and then with the addition of heat to bring the reaction mixture near boiling. After passing hydrogen sulphide through for about 1½ hours, air is passed through the reduction mixture to remove hydrogen sulphide and oxidize ammonium sulphide produced to sulphur. The sulphur is filtered off, the filtrate acidified and the crude product filtered off. Purification is effected by dissolving the crude product in a caustic soda solution, neutralized to a pH of 7, filtering off solid material, treating with decolorizing carbon and reprecipitating with acid. If desired, the purified product may be dissolved in a minimum amount of hot water, using caustic soda and adjusting to a pH of 7. On cooling, the sodium salt crystallizes out and can be further purified to complete whiteness by recrystallization from hot water. Titration by nitrite gives an equivalent weight of 251 as against a theoretical equivalent of 252.

Example 6

*Trisodium Di(N-sulphanilylsulphanil) amide*

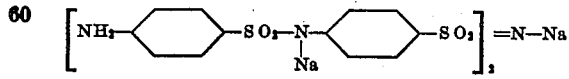

1 mol of sodium disulphanilamide prepared as described in Example 2 is dissolved in 1700 parts of water. 50 parts of soda ash are added and then 2.2 mols of freshly prepared acetylsulphanilylchloride paste are introduced with agitation, a pH of 8 to 10 being maintained by the addition of 50% caustic soda solution as necessary. The temperature is maintained at 35–40° C. by external cooling and stirring at the same temperature is continued for 2 hours after the addition of the acetylsulphanilylchloride is complete. The reaction mixture is then heated to 90° C., clarified and the clarified liquid acidified with about 400 parts of concentrated hydrochloric acid. The precipitated salt is filtered off and the filtrate discarded.

The paste is hydrolyzed by boiling for a half hour with 1200 parts of 18% hydrochloric acid after solution is complete. The reaction mixture is then neutralized with caustic soda to a pH of 4 to 5 and a tarry mass separates out. This is dissolved in a minimum amount of hot water containing sufficient 50% caustic soda solution to bring the pH up to 9 to 10. Decolorizing carbon is added to clarify, the mixture cooled and three volumes of alcohol added. A crystalline product which precipitates out is filtered off and washed with alcohol. Purification may be effected by repeated solution in small amounts of hot water and treatment with decolorizing carbon and precipitation with alcohol. The resulting product is a mixture of the di- and tri-sodium salts and a nitrite titration shows a molecular weight of 698 which corresponds to a theoretical weight for the trisodium salt of 703. The analysis for sodium shows 9.5% as against 9.81% called for by the theory.

Example 7

*Sodium sulphanil(N-sulphanilylsulphanil)-amide*

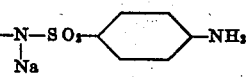

1 mol of sulphanilamide is dissolved in 1000 parts of water at 35° C. with the addition of sufficient caustic soda to bring the pH to 11. 2.4 mols of freshly prepared acetylsulphanilylchloride paste is then added during 20 minutes while maintaining a pH at 10 to 11 by the addition of 50% caustic soda solution as required. Sufficient ice is added from time to time to maintain the temperature at 35–45° C. and stirring is continued for an hour after the addition is complete.

The product is hydrolyzed by adding 200 parts of caustic soda to the reaction mixture and boiling for two hours until there is no further increase in diazotizable amine. The hydrolysis mixture is neutralized to a pH of 7.5, cooled and the crude product crystallized out. Purification is effected by repeated recrystallizations from hot water using decolorizing carbon. Titration by nitrite gives a molecular weight of 256 as against 252 for theory.

If the free amide is desired, it may be produced by acidification of a solution of the sodium salt. The amide comes down as a tarry mass which crystallizes on rubbing in alcohol. Nitrite titration shows an equivalent weight of 243 as against 241 for theory.

Example 8

*Methyl di(N-acetylsulphanil) amide*

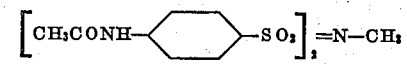

1 mol of sodium di(N-acetylsulphanil) amide is suspended in 2000 parts of dry xylene and two mols of dimethyl sulphate added. The mixture is heated under a reflux condenser for three hours and the solid produced filtered off, the filtrate being discarded. The solid is suspended in 3000 parts of water and warmed with the addition of 50% caustic soda solution until the solution is permanently alkaline to phenolphthalein. Insoluble material is filtered off and constitutes the crude methylated product. Unmethylated material can be recovered by acidification of the filtrate and reprocessed. The crude material can be purified by dissolving in glacial acetic acid and precipitating by dilution with water. On heating, the product decomposes indefinitely above 210° C.

EXAMPLE 9

*Naphthionyl(p-toluenesulphanil)amide*

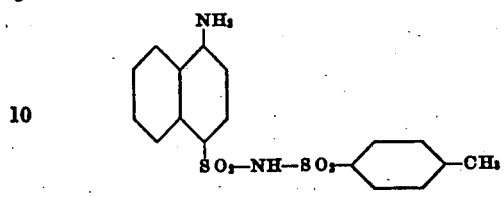

1 mol of acetylnaphthionamide is suspended in 1000 parts of water and the pH adjusted to 10 to 11 by the addition of caustic soda. 1.5 mols of paratoluenesulphonchloride is added over a period of 2 hours while maintaining the reaction mixture at 60-65° C., strong caustic soda solution being added to maintain the pH between 9 and 10. The mixture is then neutralized to pH of 7.5 and clarified with decolorizing carbon. After clarification, the solution is made acid to Congo with hydrochloric acid and the precipitate filtered off. This is crude paratoluenesulphonyl-acetylnaphthionamide.

The product is hydrolyzed by dissolving in 1000 parts of water containing three mols of caustic soda and boiling for 2½ hours. The hydrolysis mixture is acidified until it turns Congo red and is cooled, the crude product being filtered off. Purification is effected by recrystallization from dioxane using decolorizing carbon. The compound melts with decomposition at 156-157° C.

What I claim is:

1. Disulphonamides having the following formula:

in which R is an aminoaryl radical, R' is a mononuclear aryl radical and X is a member of the group consisting of hydrogen, a metal, an alkyl radical and an aryl radical.

2. Di(aminoarylsulphon)amides having the following general formula:

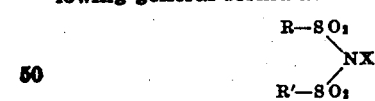

in which R is an aminoaryl radical, R' is a mononuclear aryl radical containing at least one amino group or substituted amino group and X is a member of the group consisting of hydrogen, a metal, an alkyl radical and an aryl radical.

3. Di(aminoarylsulphon)amides having the following formula:

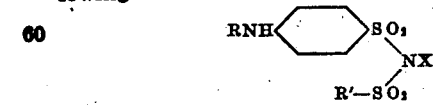

in which R is hydrogen, an acyl or an aminoarylsulphonyl radical, R' is an aminoaryl radical and X is a member of the group consisting of hydrogen, a metal, an alkyl radical and an aryl radical.

4. Disulphanilamides having the following formula:

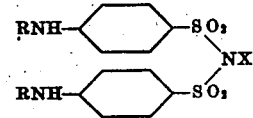

in which R is a member of the group consisting of hydrogen, an acyl and an aminoaryl radical and X is a member of the group consisting of hydrogen, a metal, an alkyl radical and an aryl radical.

5. Di(aminobenzenesulphonyl)amide having the following formula:

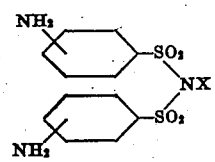

in which X is a member of the group consisting of hydrogen, a metal, an alkyl radical and an aryl radical.

6. Disulphanilamides having the following formula:

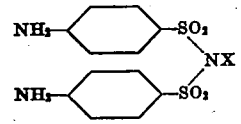

in which X is a member of the group consisting of hydrogen, a metal, an alkyl radical and an aryl radical.

7. A soluble salt of disulphanilamide having the following formula:

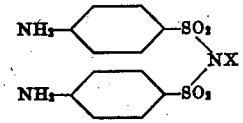

in which X is a metal forming a water-soluble salt of disulphanilamide.

8. A method of producing a di(aminoarylsulphon)amide which comprises reacting an acetylaminoarylsulphonchloride with an acetylaminoarylsulphonamide and hydrolyzing the acetylamino group.

9. A method of preparing a di(aminoarylsulphon)amide which comprises reacting an acetylaminosulphonchloride with ammonia, at least two mols of the acetylaminoarylsulphonchloride being present for each mol. of ammonia and hydrolyzing the acetylamino group.

10. A method of preparing a di(aminoarylsulphon)amide which comprises reacting a nitroarylsulphonchloride with a compound included in the group consisting of acetylaminoarylsulphonamides and nitroarylsulphonamides, reducing all nitro groups to amino groups and hydrolyzing any acetylamino group present.

11. Disulphonamides according to claim 1 in which X is a heavy metal.

12. Di(aminoarylsulphon)amides according to claim 2 in which X is a heavy metal.

13. Disulphanilamides according to claim 6 in which X is a heavy metal

ELMORE HATHAWAY NORTHEY.